United States Patent [19]

Shemeta

[11] Patent Number: 4,848,592
[45] Date of Patent: Jul. 18, 1989

[54] FASTENER SELECTION APPARATUS

[75] Inventor: Paul J. Shemeta, Seattle, Wash.

[73] Assignee: The Boeing Company, Seattle, Wash.

[21] Appl. No.: 9,805

[22] Filed: Feb. 2, 1987

[51] Int. Cl.$^4$ .............................................. B23Q 7/04
[52] U.S. Cl. .................................. 221/211; 221/120; 221/258; 414/733; 414/737; 414/738; 901/40
[58] Field of Search ................ 221/92, 119, 120, 121, 221/210, 211, 224, 254, 258, 262, 268; 414/4, 7, 267, 268, 273, 277, 305, 331, 732, 733, 737, 738, 743, 744 B, 752; 901/40, 23; 198/468.4

[56] References Cited

U.S. PATENT DOCUMENTS

| | | |
|---|---|---|
| 1,526,405 | 2/1925 | Williams . |
| 3,299,502 | 1/1967 | Wanesky ............................. 29/464 |
| 3,472,356 | 10/1969 | Reppert ................................ 198/33 |
| 3,820,666 | 6/1974 | Nye et al. ........................... 214/1 BV |
| 3,834,555 | 9/1974 | Bennington et al. ............. 901/23 X |
| 3,945,879 | 3/1976 | Fletcher et al. ................... 156/556 |
| 4,392,300 | 7/1983 | Billman et al. ...................... 29/739 |
| 4,502,830 | 3/1985 | Inaba et al. ....................... 901/23 X |
| 4,561,820 | 12/1985 | Matheny, III et al. ............. 414/331 |

FOREIGN PATENT DOCUMENTS

| | | | |
|---|---|---|---|
| 262702 | 12/1985 | Japan ................................. 414/331 |
| 131845 | 6/1986 | Japan ................................. 414/331 |
| 136831 | 6/1986 | Japan ................................. 414/752 |
| 155108 | 7/1986 | Japan ................................. 414/277 |
| 562721 | 10/1975 | U.S.S.R. ............................ 221/211 |

Primary Examiner—Joseph J. Rolla
Assistant Examiner—David H. Bollinger
Attorney, Agent, or Firm—Christensen, O'Connor, Johnson & Kindness

[57] ABSTRACT

An automatic fastener selection apparatus for segregating a single fastener from a particular contained pile of fasteners and for depositing the segregated fastener into the intake device of a fastening machine is disclosed. The apparatus is capable of segregating headed or non-headed fasteners within a wide range of sizes. The apparatus includes a scoop (20) that is connected to the forward end of a shaft (22). The scoop is mounted for movement into and out of a bin (24). The bin contains a pile of randomly oriented fasteners (26). When moved into the bin (24) the blade (28) of the scoop is thrust beneath at least some of the fasteners. The scoop is then tipped upwardly so that a number of fasteners remain on the upper surface of the scoop and slide inwardly to the corner (30) of the scoop. The scoop includes a vacuum port (34) and associated mechanisms for capturing a single fastener as the scoop is rotated into an inverted position within the bin, after the shaft is tilted to remove the scoop from the pile. The scoop is then retracted from the bin to a point over the intake device of an automatic fastening machine and the single captured fastener is released into the intake device.

18 Claims, 6 Drawing Sheets

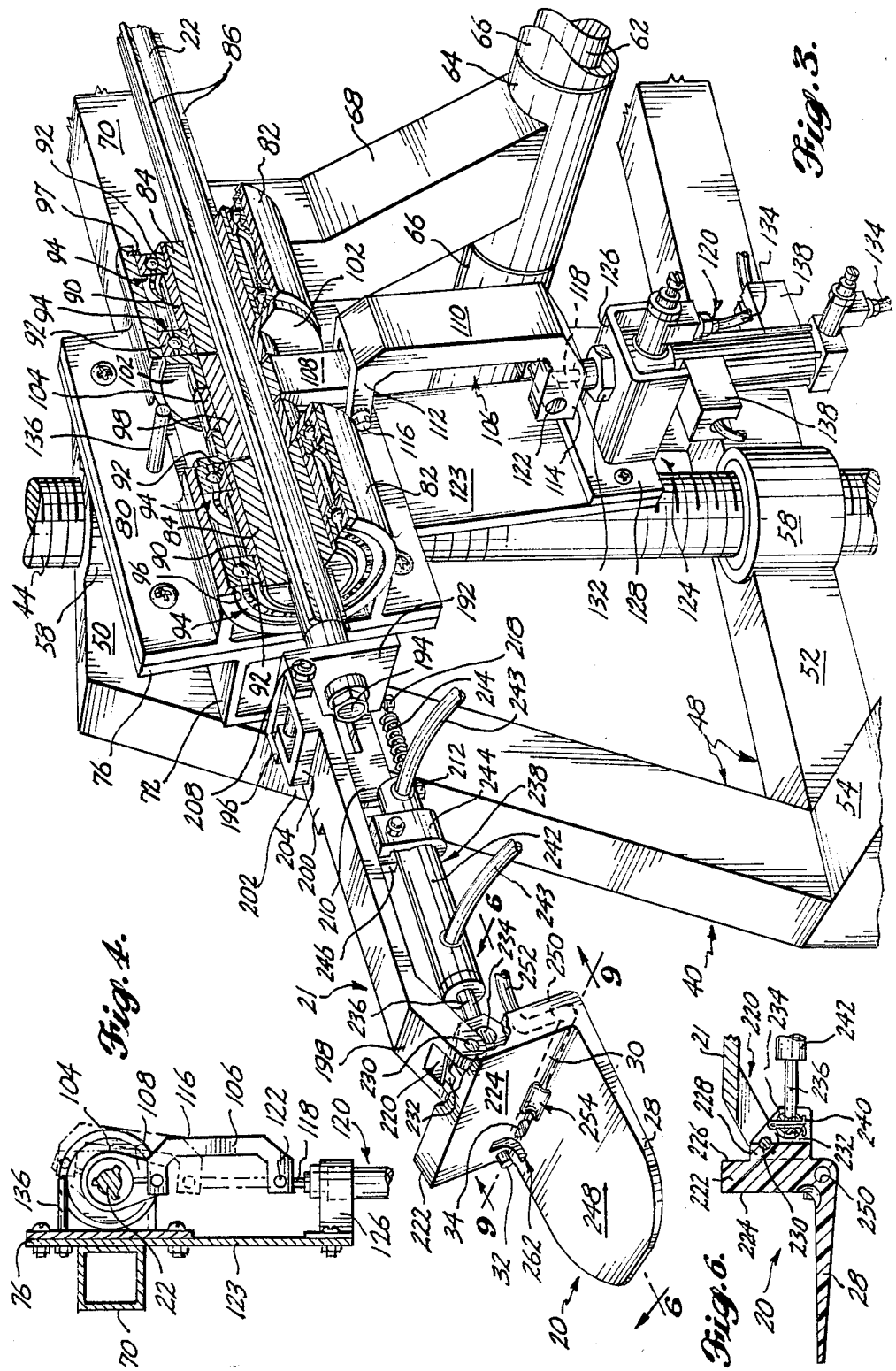

FASTENER SELECTION APPARATUS

TECHNICAL AREA

This invention pertains to the delivery of fasteners from a supply source to a fastening machine, particularly to an apparatus for segregating a single fastener from a selected pile of fasteners for delivery to the fastening machine.

BACKGROUND OF THE INVENTION

Fastening machines, i.e., machines that insert fastener parts during the assembly of a structure, are used in a variety of industrial environments. In the aircraft industry, fastening machines that automatically drill a hole and install a fastener, e.g., a rivet, are used in the fabrication of wings and other parts of an aircraft. Fastening machines designed for the aircraft industry are usually capable of installing a variety of both headed and non-headed fasteners. In some cases different fasteners are intermixed during the course of assembly. Accordingly, fastening machines must be fed with fasteners delivered in a particular order of types and sizes. To this end, a modern fastener selection apparatus must be capable of automatically selecting the required fastener from a supply of fasteners. Since the most economical way of storing fasteners is in a plurality of contained, randomly-oriented piles, a fastener selection apparatus must be capable of selecting the appropriate pile and segregating a single fastener from the selected pile before directing it into the feeder system of the fastening machine.

One presently available apparatus for segregating a fastener from a pile for delivery to a fastening machine is a plural vibratory bowl apparatus, i.e., an apparatus that includes a plurality of bowls, each filled with fasteners of a given size and type. The bowls are vibrated in a manner that causes the fasteners in the bottom of the bowl to creep up a spiral track fixed along the inside of the bowl. The fasteners exit the vibrating bowls one at a time and are directed through a chute or channel into the feeder system of the fastening machine. Since each bowl can handle only a single size and type of fastener, this apparatus has the disadvantage of requiring a substantial amount of space to accommodate the many bowls required for the many sizes of fasteners used in a modern assembly plant. While hand fastener selection can be used, this method has the disadvantage of being slow and subject to the errors encountered when humans are employed for tedious, repetitive tasks. Hence, there is a need for fastener selection apparatus that is relatively small and reliable.

SUMMARY OF THE INVENTION

This invention is directed to an automatic fastener selection apparatus for selecting a pile of fasteners, segregating a single fastener from the selected pile of fasteners, and depositing the segregated fastener into the feeder system of a fastening machine. The apparatus is capable of segregating headed or nonheaded fasteners within a wide range of sizes. More specifically, an automatic fastener selection apparatus formed in accordance with this invention comprises: (a) a scoop having a capture surface, the capture surface in part defining an elongate corner; (b) an extension and retraction mechanism for both moving the scoop into a first position wherein the capture surface lies in a selected pile of fasteners and for removing the scoop from the pile of fasteners; (c) a tipping mechanism associated with the scoop for moving the scoop from the first position and into a tipped position, the scoop being configured so that when it is in the first position and then moved into the tipped position, one or more of the piles of fasteners is directed by the scoop into contact with the corner of the capture surface; (d) inversion means for moving the scoop between the tipped position and an inverted position, the scoop also being configured so that as it moves from the tipped toward the inverted position, any fasteners contacting the corner of the capture surface tend to slide along the length of the corner, and so that as the scoop reaches the inverted position, fasteners in contact with the capture surface tend to fall from the capture surface; and, (e) a fastener capture mechanism associated with the capture surface for selectively retaining a single fastener in contact with the corner of the capture surface as the scoop moves into the inverted position.

In accordance with further aspects of this invention, the fastener capture mechanism includes a stop that projects outwardly from the corner of the capture surface. The stop is located at one end of the corner and interferes with the movement of fasteners as they slide along the corner of the scoop as the scoop moves from the tipped to the inverted position. The sliding movement of any fastener that has both of its ends in contact with the corner is halted as it slides into contact with the stop (or into contact with a similarly disposed fastener lying between it and the stop). Preferably, the fastener capture mechanism also includes a vacuum port formed in the corner of the capture surface, near the stop. The stop and port are arranged so that the first fastener lying completely within the corner (i.e., with both ends in contact with the corner) that slides into contact with the stop will substantially cover the vacuum port. The vacuum port is connected to a vacuum source that produces suction in the port that captures the single fastener that slides against the stop and covers the port.

In accordance with other aspects of this invention, the scoop is configured to capture fasteners lying within a wide range of sizes, whether headed or nonheaded. To accommodate headed fasteners, the capture surface includes recesses formed in the corner on opposing sides of the vacuum port. The recesses receive the head of a headed fastener. The recesses permit a headed fastener to lie evenly across the port so that it can be held by the suction created in the port. Further, the recess that is located between the vacuum port and the stop is configured to halt the movement of any headed fastener that has both ends in contact with the corner and slides head-first toward the stop. That is, the sliding movement of a headed fastener so oriented is halted by the recess, not the stop, when the head of the fastener head drops into the recess. In any event, the result is the same—the fastener lies across the vacuum port and is captured when vacuum is applied to the port.

In operation, the scoop is moved by the extension and retraction mechanism into a pile of fasteners. The tipping mechanism then moves the scoop into the tipped position so that one or more of the fasteners is directed into contact within the corner of the capture surface. The vacuum source is then activated to create a vacuum in the vacuum port. Next, the scoop is moved from the tipped position into the inverted position. As the scoop moves from the tipped position, the stop, recesses and vacuum port combine to capture a single fastener, as discussed above. When the scoop has reached the inverted position, the captured fastener remains in contact with the capture surface. Any other fasteners on the scoop's capture surface fall back into the pile because they are not held by the vacuum that holds the captured fastener. Next, the scoop is retracted into position over the intake of the fastening machine feeder system and the vacuum is removed. As a result, the fastener drops into the feeder system intake. The scoop is then returned to the pile of fasteners and the cycle is repeated.

Since the scoop performs the fastener segregating operation, the fastener storage containers or "bins" of the present invention require no associated vibration and are more compact than prior art vibratory bowl containers. Further, the bins of the present invention are configured to hold any desired size or type fastener. Therefore, it is not necessary to have a bin specially designed for each type or size fastener.

In accordance with yet another aspect of this invention, the bins are arrayed on a turntable located in front of the scoop. The bins are arranged in verticle columns on this turntable. The outermost ends of the bins are open for access by the scoop. The turntable is rotatable and controllable to present any one vertical column of bins in front of the scoop for access by the scoop. The scoop is connected to a lift mechanism suitable for positioning the scoop at any point along a vertical path aligned with the presented column of bins. Accordingly, through rotation of the turntable and actuation of the lift mechanisms, all of the bins are accessible by the scoop. As noted earlier, even though a different type or size of fastener resides within each bin, a scoop formed in accordance with this invention is capable of segregating a single fastener from its pile, regardless of the fastener's type or size.

BRIEF DESCRIPTION OF THE DRAWINGS

The invention, with its attendant advantages, will become better understood from the following detailed description when considered in combination with the accompanying drawings, wherein:

FIG. 3 is an isometric detail view, in partial section, showing the scoop and mechanisms for tipping and inverting the scoop of the fastener selection apparatus illustrated in FIGS. 1 and 2;

FIG. 4 is a frontal view taken along lines 4—4 of FIG. 2;

FIG. 6 is a cross-sectional view taken along lines 6—6 of FIG. 3;

DESCRIPTION OF THE PREFERRED EMBODIMENT

Figure 1:
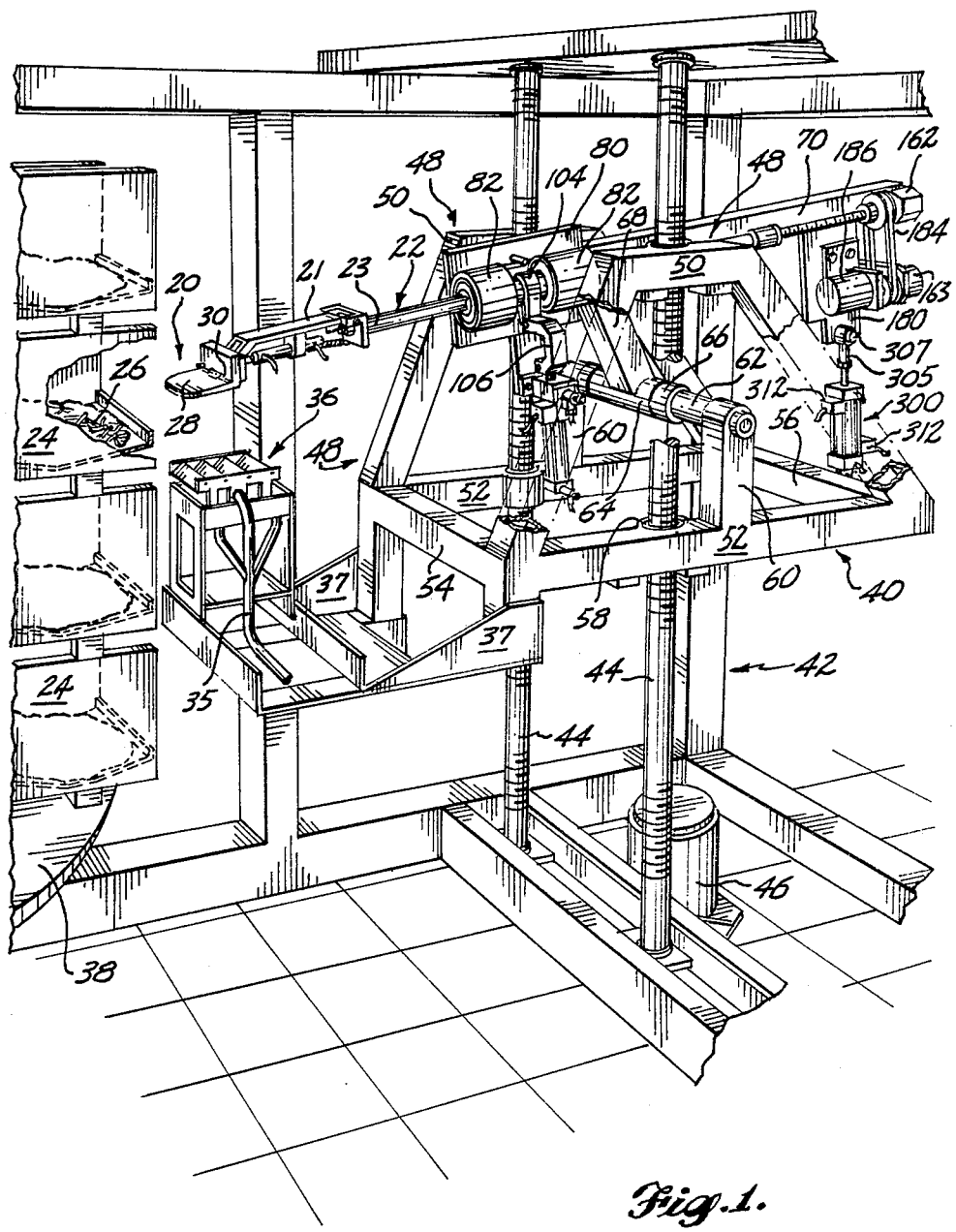
FIG. 1 is an isometric view of a fastener selection apparatus formed in accordance with this invention.
Figure 2:
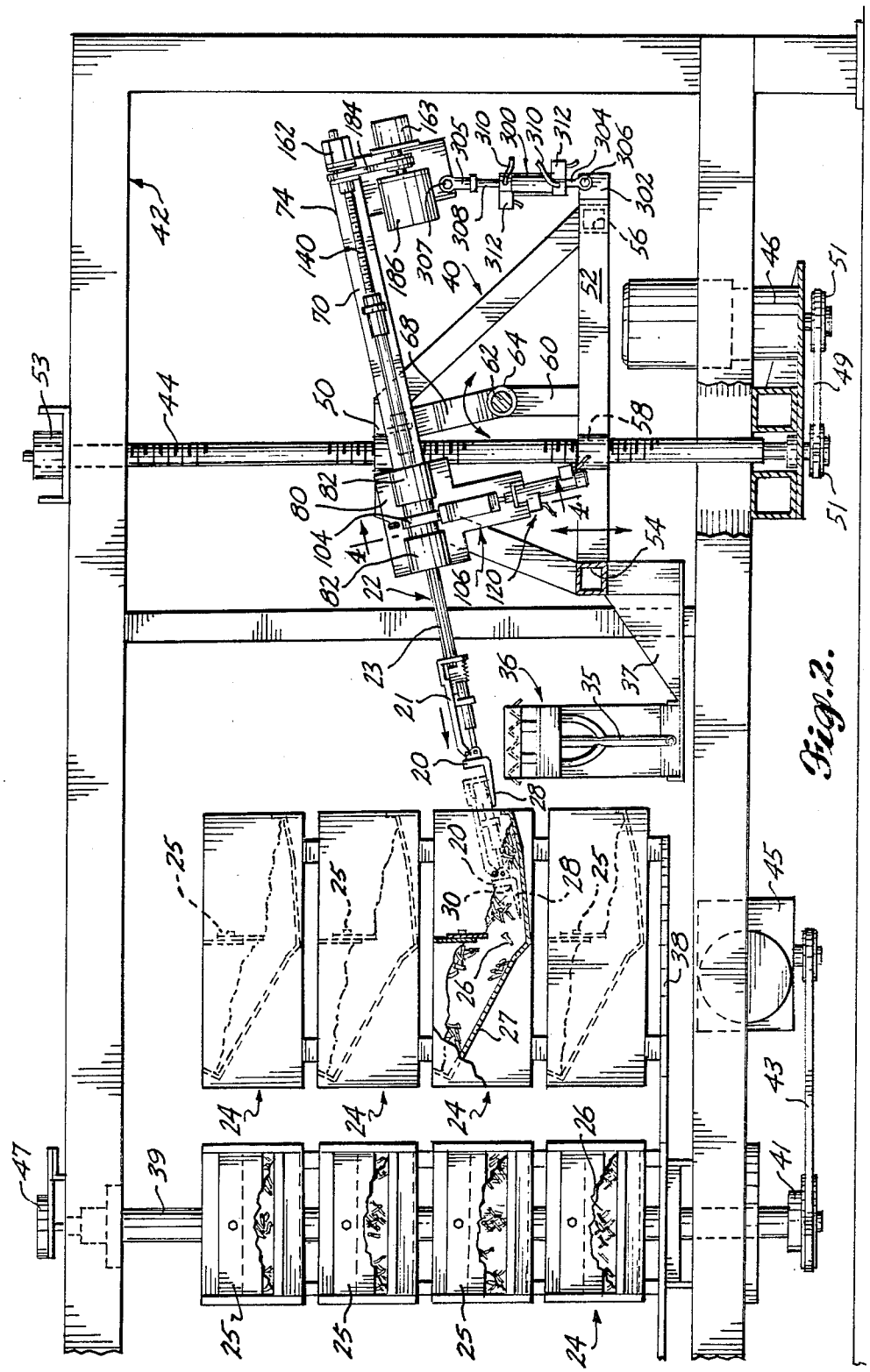
FIG. 2 is a side elevation view of the fastener selection apparatus of FIG. 1.

As shown best in FIGS. 1 and 2, a fastener selection apparatus formed in accordance with this invention generally comprises an L-shaped scoop 20 that is connected via link 21 to the forward end 23 of a shaft 22. The scoop is moved by the shaft into and out of a bin 24 that is aligned with the scoop. The bin is one of several, each of which contains a pile of randomly-oriented fasteners 26. When moved into the bin 24, the blade 28 of the scoop is thrust beneath at least some of the fasteners. The scoop 20 is then tipped upwardly so that a number of fasteners are scooped onto the upper surface of the scoop and slide inwardly to the corner 30 of the scoop. This position is called the tipped position and is shown by solid lines in FIG. 7.

Figure 9:
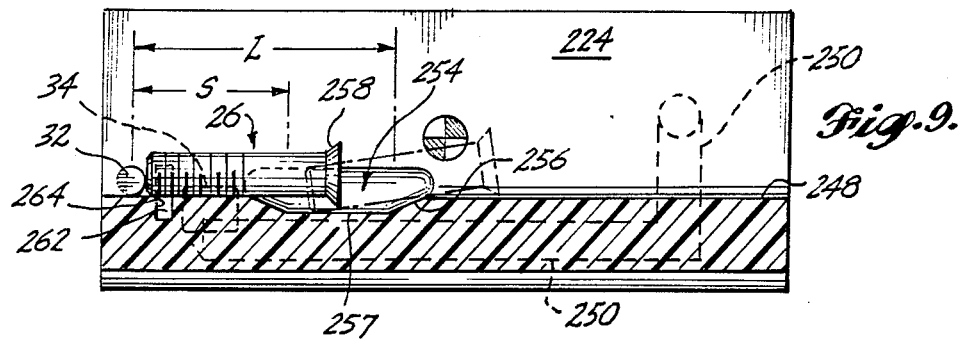
FIG. 9 is a sectional view of the scoop taken along lines 9—9 in FIG. 3.

Referring to FIGS. 3 and 9, the corner 30 of the scoop has a projecting stop 32 formed in one end. A vacuum port 34 is formed in the corner near the stop 32. The vacuum port 34 is connected to a selectively actuatable vacuum source. To facilitate the segregation of a single fastener from the pile, the shaft 22 and, hence, the scoop 20, is rotated nearly 180° from its tipped position within the bin 24 to an inverted position (shown by solid lines in FIG. 8). The direction of rotation is such that fasteners 26 located in the corner 30 of the scoop slide along the corner toward the stop 32. Any fastener that has both of its ends in contact with the corner will be halted as it slides into contact with the stop (or into contact with a similarly disposed fastener lying between it and the stop). The fastener that slides up against the stop (thus covering the port 34) is held attached to the scoop by suction force in the vacuum port 34. The vacuum port 34 and stop 32 are configured so that only a single fastener will be held in the corner after the bin is rotated into its inverted position; the remaining fasteners falling back into the pile.

With the scoop 20 inverted and a fastener captured in the corner, the shaft 22 is retracted until the scoop is over the intake 36 (FIG. 1) of a fastening machine feeder system. At that time, the suction vacuum is removed, resulting in the single fastener falling into the intake 36 and fed to the fastening machine.

The bins 24 are stacked in vertical columns about the periphery of a circular horizontal turntable 38. The turntable 38 is rotatable so that any one of the columns of bins can be aligned with, and, thus, accessed by the scoop. Furthermore, the scoop and its control mechanisms are mounted on a carriage 40 that is upwardly and downwardly movable along a vertical path aligned with the presented column of bins. Accordingly, any of the plurality of bins stacked on the turntable (hence any size or type fastener contained in any of those bins) can be selected by the apparatus of the invention; and, a single fastener within the selected bin can be segregated and delivered to the fastening machine. The height of the pile of fasteners available to the scoop is controlled by a vertically adjustable gate 25 positioned in the mid-region of each bin 24.

Turning now to the particulars of the preferred embodiment of a fastener selection apparatus formed in accordance with the invention and referring to FIGS. 1–6, the overall apparatus is assembled within a support framework 42. Within one end of the framework, stacks of bins 24 are mounted on the rotatable turntable 38. Next to the turntable is the scoop 20 and its control mechanisms. The scoop and mechanisms that directly control the scoop's movement are mounted on a carriage 40 that is carried by two rotatable, vertically-oriented, parallel jackscrews 44 that extend between the top and bottom of the support framework 42. More specifically, the carriage 40 includes a frame comprising a pair of spaced-apart sides 48 formed of interconnected box beams. The box beams form a trapezoid with opposing parallel top and bottom beams 50, 52 being substantially horizontally disposed. The spaced-apart sides 48 of the carriage frame are joined by front and back box beams 54, 56 that extend between the corresponding front and back ends of the bottom beams 52.

An internally threaded annulus 58 is mounted in the center of the top beam 50 and the center of the bottom beam 52 of both sides 48 of the carriage frame. One jackscrew 44 is threaded through the two thusly aligned annuli on one side 48 of the frame and the other jackscrew 44 is threaded through the two thusly aligned annuli on the other side of the frame.

As will become better understood from the following description of the operation of the embodiment of the invention illustrated in the drawings, in order for the scoop to access any one bin in a column of bits, the carriage 40 that carries the scoop and its control mechanisms must be movable through a vertical path aligned with a column of bins. This is accomplished when the jackscrews 44 are simultaneously rotated. That is, when the jackscrews 44 are simultaneously rotated, the carriage, which is connected to the jackcrews via the annuli 58, is raised or lowered depending upon the direction of the jackscrew rotation. The jackscrews are rotated by a carriage motor 46 that is mounted to the bottom of the support framework 42. Preferably, the carriage motor is an AC electric motor. The carriage motor 46 is connected to the jackscrews by a drive belt 49 that extends around pulleys 51 that are mounted on the shaft of the motor and on the lower ends of the jackscrews.

A carriage height encoder 53 is connected to the top of one of the jackscrews 44. When the jackscrew is rotated, the encoder provides a series of pulses. The pulses denote the direction and magnitude (one pulse per increment of movement) of jackscrew rotation. The pulses are accumulated, i.e., the pulses are used to increment or decrement a pulse count value. The pulse count value thus denotes the height of the carriage. The thusly developed carriage height information is utilized by the control system to control the height of the carriage, as described below.

Extending vertically upwardly from the top of each bottom beam 52 of the carriage frame is a vertical arm 60. The vertical arms 60 extend upwardly about half the distance between the top and bottom beams 50, 52. A rod 62 extends between the uppermost ends of the vertical arms 60. A rotatable, cylindrical sleeve 64 is mounted on the central portion of the rod 62. The sleeve 64 is kept in the central location on the rod by two annular collars 66 that are fastened to the rod at each end of the sleeve 64.

Connected to, and extending upwardly from, the sleeve 64 is a dog-leg shaped arm 68. The upper end of the dog-leg shaped arm 68 is connected to a straight, elongate beam 70 that lies above the rod 62. The beam 70 is preferably a box beam. The longitudinal axis of the beam is substantially perpendicular to the longitudinal axis of the rod 62, offset from the center of the rod by the dog-leg shaped arm 68.

The beam 70 has a forward end 72 and a rearward end 74. The beam supports various mechanisms for moving the scoop through the positions mentioned earlier. More particularly, with reference to FIGS. 3 and 4, unitarily formed with one vertical side of the forward end 72 of the straight, elongate beam 70 is a plate 76 on which a shaft rotation assembly is mounted. The shaft rotation assembly supports the shaft 22, and guides its longitudinal extension and retraction. Furthermore, the shaft rotation assembly is actuable to rotate the shaft and scoop to facilitate the fastener segregation operation described above.

The shaft rotation assembly comprises a mounting plate 80 that is secured to the vertical plate 76 that is located on the forward end 72 of beam 70. Two cylindrical, spaced-apart bearing blocks 82 are fastened to the outer face of the mounting plate 80. The bearing blocks house bearing assemblies through which the shaft 22 passes. The bearing blocks 82 and the bearing assemblies housed within each block are substantially identical. Accordingly, only one bearing assembly will be described, with identical reference numerals being assigned to identical parts of both assemblies.

The bearing assembly that is housed within each bearing block 82 comprises a cylindrically-shaped inner bearing 84 through which the shaft 22 passes. More specifically, the shaft 22 is configured to have three longitudinally extending splines 86 equally spaced apart around its circumference. The inner bearing 84 has three keyways formed in the surface of a cylindrical, longitudinal inner aperture that receive the shaft's splines. Accordingly, the shaft is free to slide longitudinally through the inner bearings 84 but not rotate relative to them. Thus, the inner bearings are linear bearings.

Surrounding each inner bearing is a substantially cylindrical bearing spacer 90 that has circumferential recesses formed in both ends. The inner race 92 of a ball bearing 94 is seated in each circumferential recess in the spacer 90. When the bearing assembly is assembled in the manner illustrated in the drawings and described herein, the outer race of the outermost ball bearing 94 of the bearing block 82 that is nearest the forward end 72 of the beam 70 presses against a radially inwardly projecting annular lip 96 formed in the outermost end of each bearing block. The outer race of the outermost ball bearing of the other bearing block presses against a snap ring 97 located at the outermost end of that bearing block.

A central inner bearing 98, which is configured substantially identically to the inner bearing 84 of each bearing block 82, surrounds the shaft 22 between the bearing blocks 82. Cylindrical collars 100 are located at each end of the central inner bearing 98. Each collar has a flanged end 102 that extends radially outwardly and is positioned so as to bear against the facing side of the innermost ball bearings 94 of each bearing block 82 and the inner edges of the bearing spacer 90. Thus, the bearing spacers 90 and the ball bearings mounted on the spacers are pressed against the annular lip 96 on one end and the snap ring 97 on the other end.

The shaft 22 is rotated by a crank assembly that rotates the central inner bearing 98. As shown best in FIG. 3, the crank assembly comprises a crank 104 having a collar located on one end that is fastened to the middle portion of the central inner bearing 98, between the two cylindrical collars 100. A connecting link 106 is pivotally connected to the outermost end of the arm 108 of the crank. The connecting link 106 is generally C-shaped having a back 110 with two outwardly projecting upper and lower legs 112, 114. Each leg of the connecting link opens at its end to create a yoke. The arm 108 of crank 104 fits within the yoke formed by the upper leg 112 and is pivotally attached thereto by a pivot pin 116.

The lower leg 114 of the connecting link 106 is pivotally connected via a similar clevis-type connection to the piston rod 118 of a hereinafter-described scoop rotation actuator 120. More particularly, a rotatable pivot pin 122 is journaled into lower leg 114 to extend across the opening formed in the lower leg. The pivot pin has a threaded aperture drilled transversely through its center so that the aperture is exposed within the opening. The end of the piston rod 118 is threaded into the aperture in the pivot pin 122.

The scoop rotation actuator 120 is a dual action hydraulic actuator secured by a bracket 124 to a downwardly extending rectangular projection 123 that forms part of the mounting plate 76. The bracket 124 comprises a rigid, substantially U-shaped channel 126 having a flat plate 128 attached across one end. The plate 128 is fastened to the mounting plate projection 123 so that the U-shaped channel opens downwardly. The channel 126 has a hole formed in its base. One end of the cylinder of the scoop rotation actuator 120 includes a threaded protrusion that fits through the hole in the channel 126. The scoop rotation actuator is fastened to the mounting bracket by a nut 132 that is threaded onto the protrusion.

When the scoop rotation actuator 120 is energized to extend the piston rod 118, the connecting link 106 and crank 104 transform the linear motion of the piston rod into rotational motion of the central inner bearing 98 and shaft 22. The connecting link is configured so that its legs 112, 114 extend outwardly for a distance sufficient to substantially straddle the shaft 22 when the piston rod is fully extended. Therefore, as shown by dotted lines in FIG. 4, the connecting link 106 does not interfere with the rotation of the shaft. Further, the connecting link can rotate the shaft through an angle slightly less than 180° when the piston rod 118 moves between its fully retracted and its fully extended positions. As will be better understood from the following description of the scoop mounting mechanism, rotation of the shaft results in rotation of the scoop.

A stop pin 136 is attached to and extends outwardly from the upper central region of the mounting plate 76. The stop pin 136 is positioned to contact the arm 108 of the crank when the piston rod 118 is fully extended. The stop pin 136 ensures that the pivot pin 116 in the upper leg 112 of the connecting link never reaches a position directly over the central axis of the shaft 22 because movement of the pivot pin over or beyond the central axis of the shaft would result in jamming of the crank assembly when the piston rod 118 is retracted.

The scoop rotation actuator 120 is energized in one direction or the other by pressurized hydraulic fluid conveyed through a pair of tubes 134. The timing and direction of energization is controlled by hydraulic valves (not shown) as required by the sequence of operation of the invention as described below.

The scoop rotation actuator is equipped with two scoop rotation position sensors 138 mounted on the cylinder on opposing ends thereof. The sensors 138 provide a signal that is indicative of the position of the piston within the cylinder (hence, the rotational position of the shaft 22 and scoop 20). The position information produced by the sensors is utilized by the control system that controls the sequence of operation of the fastener selection apparatus and is described in detail below.

Figure 5:
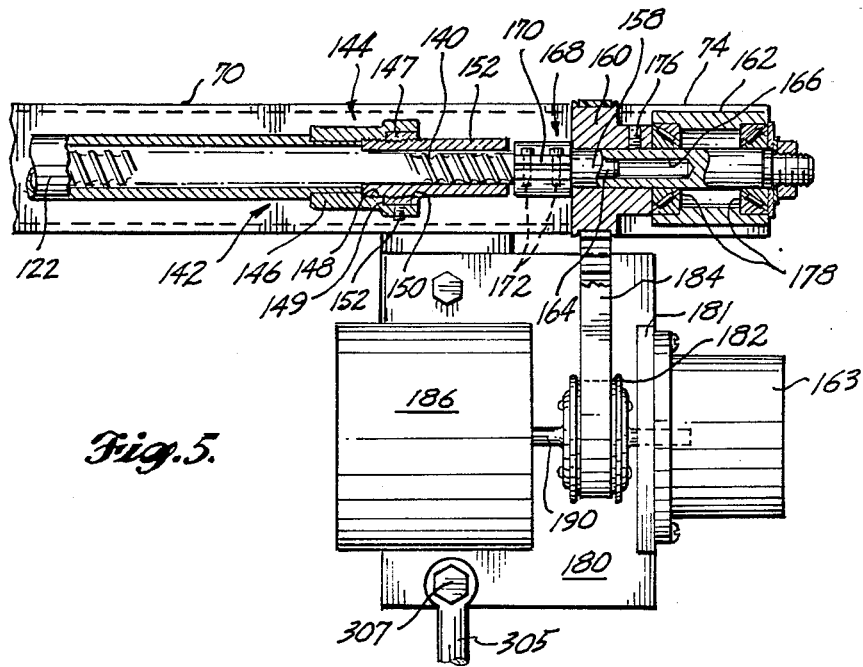
FIG. 5 is a side elevation view, in partial section, showing the mechanism for extending and retracting the shaft to which the scoop shown in FIG. 3 is attached.

With reference to FIGS. 2 and 5, the mechanisms for extending and retracting the shaft 22 and attached scoop are next described. The shaft 22 is hollow. A threaded drive screw 140 is mounted in the shaft. A coupling assembly 144 threadably attaches the end 142 of the shaft remote from the scoop to the drive screw 140. More specifically, the coupling assembly 144 comprises a collar 146 that is affixed to the end of the shaft 22. A portion of the collar 146 extends beyond the end of the shaft. The portion of the collar that extends beyond the end of the shaft has a stepped bore comprising an inner bore section 148 and an outer bore section 150. The outer bore section 150 has a slightly greater diameter than the inner bore section 148. The wall of the inner bore section 148 is threaded.

A hollow cylindrical drive screw follower 152 is threaded onto the drive screw 140. More specifically, threads located on one end of the exterior of the follower 152 mate with the threads formed in the inner bore section 148 of the collar 146. The follower is secured against rotation relative to the fitting by a lock ring 147 that is threaded over the exterior threads of the follower and tightened against the shoulder 149 that is formed by the stepped bore of the fitting. Set screws 154 that pass through the outermost portion of the fitting and bear upon the exterior of the lock ring 147 hold the lock ring in place. Preferably, four set screws equally spaced around the periphery of the fitting are employed. The coupling configuration just described results in rotation of the drive screw 140 causing longitudinal movement of the follower 152, and, thus, the shaft 22.

The drive screw 140 is supported and rotated at its outermost end by a drive assembly that includes a drive shaft 158 that extends outwardly from a bearing block 162 mounted on the rearward end 74 of beam 70. The longitudinal axis of the drive shaft 158 is coaxial with the longitudinal axis of the drive screw. Further, the drive shaft 158 is connected to the drive screw 140 and driven by a reversible shaft extension motor 163. Specifically, the rearmost end of the drive screw 140 terminates in a stub shaft 164 that fits into a central axial cavity 166 formed in the adjacent end of the drive shaft 158. More specifically, the drive shaft 158 has an enlarged end 168 that fits over the stub shaft 164. A longitudinal slot 170 is formed in the enlarged end of the drive shaft. The slot 170 extends radially outwardly from the central cavity of the drive shaft. A pair of cap screws 172 positioned outside of the cavity 166 are threaded into the enlarged diameter portion of the shaft across the slot 170. When the screws 172 are tightened, the drive shaft 158 is securely clamped to the drive screw stub shaft 164.

A timing belt pulley 160 is mounted on the drive shaft 158 immediately adjacent the enlarged end 168. The timing belt pulley 160 is fixed to the drive shaft by a set screw 176. Rearwardly beyond the pulley, the drive shaft 158 passes through the bearing block 162. The bearing block houses a pair of spaced-apart, tapered roller bearings 178, which rotatably support the drive shaft.

A downwardly depending motor mounting bracket 180 is fixed to the rearward end of the beam 70. The bracket is a substantially flat plate having a perpendicularly projecting arm 181. Mounted on the arm 181 is the shaft extension motor 163. Preferably, the shaft extension motor is an AC brushless servo motor. Mounted on the shaft of the shaft extension motor 163 is a timing belt pulley 182 that is connected via a timing belt 184 to the timing belt pulley 160 that is mounted on the drive shaft 158. Accordingly, when the shaft extension motor 163 is energized, the drive shaft 158 and, thus, the drive screw 140 are rotated. Rotation of the drive screw extends or retracts the shaft 22 depending upon the direction of rotation of the shaft extension motor shaft.

A shaft extension encoder 186 is mounted on the motor mounting bracket 180, on the side of the timing belt pulley 182 opposite the shaft extension motor 163. The shaft 190 of the shaft extension encoder is connected to the timing belt pulley 182. The encoder provides a pulse signal that is indicative of the direction and magnitude of rotation of the timing belt pulley. The pulses produced by the encoder are accumulated in a conventional manner to create a pulse count that correlates to the longitudinal position of shaft 22. The accumulated encoder pulse count is compared to a position command pulse count and the result used to control the longitudinal position of the shaft and, thus, the scoop, as explained below.

Figure 8:
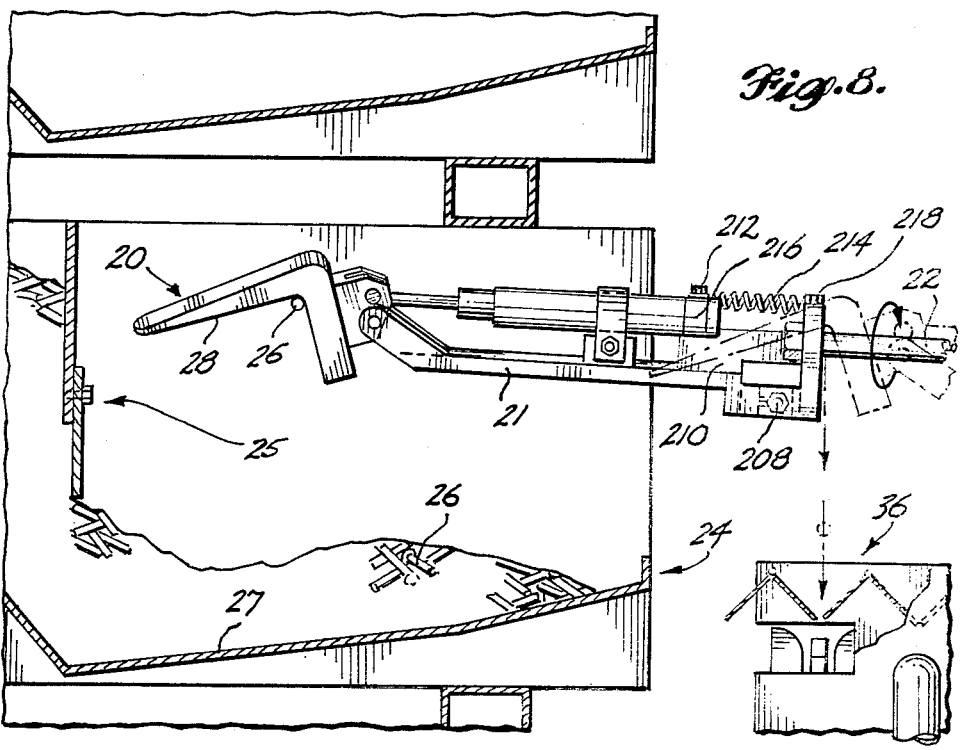

The embodiment of the fastener selection apparatus of this invention, illustrated in the drawings, requires that the shaft 22 be tiled in a vertical plane. The shaft is tilted between a thrust position and a retract position. In the thrust position, the shaft is oriented to thrust the scoop into a pile of fasteners when the shaft is extended (see FIG. 2). In the retract position, the shaft is oriented such that the scoop is located above the pile of fasteners (FIG. 8).

A tilting mechanism for moving the shaft between the thrust and retract positions is located between the end 74 of the beam 70 remote from the scoop 20, and the carriage 40. With reference to FIGS. 1 and 2, the tilting mechanism comprises a shaft tilt actuator 300 connected between the bottom of the motor mounting bracket 180 and an L-shaped bracket 302 that is fastened to the back beam 56 of the carriage frame. More particularly, a coupler 304 having a looped end is fastened to the cylinder end of the shaft tilt actuator 300 such that the looped end extends outwardly. A bolt 306 pivotally attaches the looped end to the L-shaped bracket 302. A similar coupler 305 having a looped end is attached to the end of the rod 308 of the shaft tilt actuator 300. A bolt 307 connects the looped end of the rod coupler 305 to the bottom of the mounting bracket 180. The shaft tilt actuator 300 is a dual action hydraulic actuator.

When the rod 308 of the shaft tilt actuator 300 is extended, the beam 70 pivots in a counterclockwise direction as viewed in FIG. 2 about the rod 62 that supports the beam 70 and moves the shaft 22 into the thrust position (FIG. 2). When the piston rod 308 is retracted, the arm pivots in a clockwise direction about the rod 62 and moves the shaft 22 into the retract position (FIG. 8).

The shaft tilt actuator 300 of the tilting assembly is energized by pressurized hydraulic fluid conveyed through connected tubes 310. The timing and direction of energization is controlled by hydraulic valves in a conventional manner as required by the sequence of operation of the invention.

The shaft tilt actuator 300 is equipped with two shaft tilt position sensors 312 mounted on the cylinder on opposing ends thereof. The sensors 312 produce signals that are indicative of the position of the piston within the cylinder (hence, the tilt angle of the connected beam 70 and shaft 22). The tilt information produced by the sensors is utilized to control the tilt position of the shaft 22 during operation of the fastener selection apparatus of the invention as described below.

As best illustrated in FIGS. 1–3 and 6–8, fixed to the forward end of the shaft 22 is a bracket 192. Hinged to the bracket 192 is the link 21 that connects the scoop 20 to the shaft 22. The bracket 192 is a substantially flat, rectangular plate having a hole through its center. The shank of a bolt 194 that passes through the hole and is threaded into the end of the shaft 22 secures the bracket to the shaft. A pair of integral, spaced-apart hinge arms 196 extend outwardly from the top of the bracket 192.

The link 21 is an elongate bar having a scoop end 198 and a shaft end 200. Located on the upper side of the shaft end 200 of the link is an integral, U-shaped hinge element 202. The cross-member 204 of the hinge element lies atop the link, and the spaced-apart projecting legs 206 lie between the hinge arms 196 of the bracket 192. A hinge pin 208 attaches the hinge arms 196 to the legs 206 of the hinge element 202.

Figure 7:
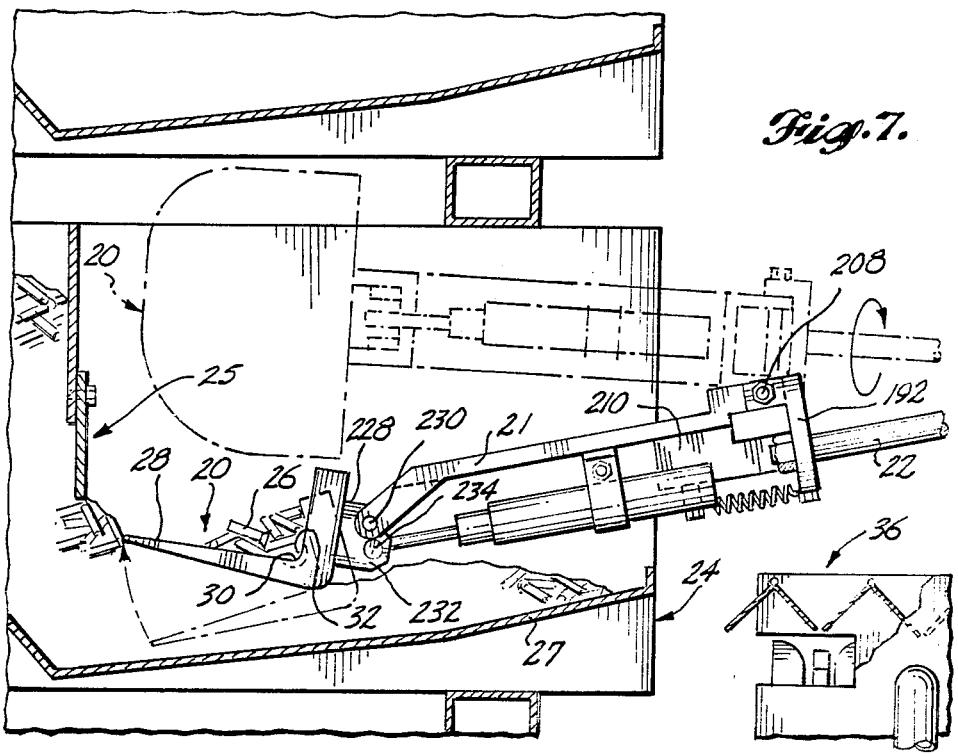
FIGS. 7 and 8 are side elevation views of the scoop and fastener storage bins shown in FIGS. 1 and 2, illustrating the sequence of the fastener segregation operation.

With reference to FIGS. 3 and 8, an integral plate 210 is located on the underside (i.e., relative to the orientation of the link as depicted in FIG. 3) of the link, at the shaft end 200 thereof. The plate 210 is roughly L-shaped, having one leg that is integral with the link 21 and extends down from the underside of the link for a short distance. The L-shaped plate is positioned such that the outer end of the other leg abuts the bracket 192 mounted on the end of the shaft 22. The L-shaped plate prevents downward swinging of the link 21 about the hinge pin 208 when the scoop is thrust into the bin (FIG. 7). A cap screw 212 is threaded into the bottom of the plate 210. One end of a coiled tension spring 214 is held between the cap of the screw and a cylindrical spacer 216 mounted on the screw between the cap and plate. The other end of the spring 214 is attached by another cap screw 218 to the bottom of the bracket 192 mounted on the end of the shaft 22. The spring holds the plate 210 in abutting contact with the shaft bracket 192, and resists upward swinging of the link 21 about the hinge pin 208 when the scoop is thrust into the bin (FIG. 7), unless sufficient force is applied to the underside of the scoop. For instance, if the fasteners in the bin happen to be aligned so that they resist the entry of the scoop into the pile, the scoop will yield (i.e., rotate upwardly about the hinge pin 208) rather than damage the apparatus.

At the scoop end 198 of the link 21, the link bends downwardly. The outermost end of the scoop end of the link opens to create a yoke 220 that makes a clevis-type connection with the scoop 20.

Referring to FIGS. 3 and 6, the scoop is a generally L-shaped. One leg of the L-shaped scoop 20 forms an outwardly tapered blade 28 and the other end forms a back wall 222. The back wall 222 has a front side 224 and a rear side 226. A block 228 is fixed to the center of the rear side 226 of the back wall. The upper end of the block 228 is straddled by the yoke 220 formed in the scoop end of the link. A pivot pin 230 that passes through the upper end of the block and yoke pivotally secures the scoop to the link.

The block 228 has a pair of spaced-apart yoke arms 232 that project outwardly, beneath the pivot pin 230. The yoke arms connect the scoop to a scoop tip actuator 238. More specifically, a second pivot pin 234 has its opposing ends journaled into the yoke arms 232 of the block and thus spans the space between the yoke arms. The rotatable pivot pin 234 includes a transverse aperture that extends through its center. The outer end of the rod 236 of the scoop tip actuator 238 is mounted in the transverse aperture in the second pivot pin 234. A cotter pin 240 that passes through an aligned aperture in both the second pivot pin 234 and the piston rod 236, attaches the piston rod to the second pivot pin. The cylinder 242 of the scoop tip actuator 238 is attached to the underside of the link 21 by a U-shaped clamp 244. More specifically, the clamp 244 attaches the cylinder to a downwardly projecting integral arm 246 located on the underside of the link 21. The scoop tip actuator 238 is a dual action hydraulic actuator.

When the scoop tip actuator 238 is powered in a manner that extends the rod 236, the scoop 20 is pivoted about pin 230 in the direction that tips the blade 28 upwardly relative to the corner 30 of the scoop (as shown in solid lines of FIG. 7). When the piston rod 236 is retracted, the scoop returns to its quiescent position (as shown in the dotted lines of FIG. 7). In this position, the blade is downwardly inclined with respect to the corner. The scoop tip actuator 238 is powered by pressurized hydraulic fluid conveyed through tubes 243. The direction and timing of the energization of the scoop tip actuator 238 is controlled via hydraulic control valves in the sequence required by the invention.

Turning now to the particulars of the scoop configuration, the front side 224 of the back wall 222, and the upper side 248 of the blade 28 define a fastener capture surface. Referring to FIGS. 3 and 9-11, corner 30 is formed where the front side 224 of back wall 222 and the upper side of the blade 28 meet. In the preferred embodiment, the corner 30 is concave in cross section and has a radius approximately equal to the radius of the fasteners that are to be segregated. When fasteners of various diameters are to be segregated, it is preferred to form the radius of the corner to match the radius of the heaviest fastener so that such a fastener will completely cover the vacuum port 34. Such sizing is preferred because, if a fastener effectively covers the vacuum port there is less likelihood of suction loss and, thus, more effective fastener capture.

The cylindrical stop 32 is located at one end of the corner and protrudes outwardly from the back wall 222. The vacuum port 34 is formed in the corner near the stop. The vacuum port 34 is roughly elliptically shaped with its long axis parallel to the longitudinal axis of the corner 30. The vacuum port 34 is spaced from the stop 32 by a distance that is less than or equal to the length of the shortest fastener to be selected. Keeping the location of the vacuum port within this distance avoids the problem of suction loss should a short fastener fail to completely cover the vacuum port. Further, although the precise dimensions of the port (measured at the capture surface) may vary, it has been found that the capture of fasteners is best accomplished when the width of the port is about ¾ of the diameter of the smallest diameter fastener to be captured.

The vacuum port 34 is located on the end of an internal passage 250 formed in the scoop. The passage 250 extends from the port 34 through the scoop to an opening on the rear side 226 of the scoop's back wall. A tube 252 connects the passage opening to a suitable vacuum source (not shown). The vacuum source is regulated to apply a suitable suction force to the vacuum port at appropriate intervals during the operation of the fastener selection apparatus.

Figures 10, 11:
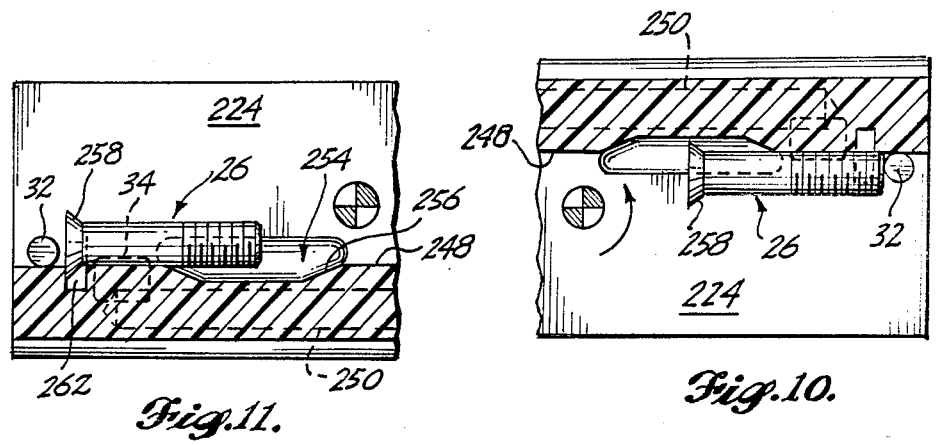
FIG. 10 is a view similar to FIG. 9, but illustrating the scoop in its inverted position.
FIG. 11 is a partial sectional view corresponding to FIG. 9, but illustrating an alternate position of a headed fastener captured by the scoop; and, FIG. 12 is a block diagram of the control system of the fastener selection apparatus illustrated in FIGS. 1–11.

The capture surface of the scoop is configured so that both headed and nonheaded fasteners can be captured by the scoop. To this end, recesses formed in the corner 30 of the scoop on opposite sides of the vacuum port 34, receive the head of a headed fastener when a headed fastener is captured by the scoop. The recesses permit the shank of a headed fastener to lie evenly across the vacuum port and, as a result, held more tightly by the port suction. The recesses include an elongate outer recess 254 formed in the corner 30 on the side of the vacuum port 34 remote from the stop 32. As shown in FIGS. 9-11, each end of the walls 256 of the outer recess are inwardly convex at the surface of the corner when viewed in plan. Also, the walls 256 slope inwardly from the top to the bottom of the recess 254. This recess configuration causes fasteners to slide completely across the outer recess toward the stop 32 without getting hung up by a recess wall (which might occur if the walls were normal to the capture surface).

Referring to FIG. 9, the bottom of the outer recess 254 must be deep enough to receive the head 258 of a headed fastener 26 so that the fastener will lie evenly across the vacuum port 34. Further, the length of the outer recess 254 must be such that the head 258 of the longest and shortest fasteners to be selected can be received within the recess. In this regard, the distance between the stop 32 and the closest end of the bottom 257 of the outer recess (i.e., the dimension indicated as "S" in FIG. 9) should be at least equal to the shortest headed fastener to be selected so that such a fastener can lie evenly across the vacuum port 34. Likewise, the distance between the stop 32 and the farthest end of the bottom 257 of the outer recess (i.e., the dimension indicated as "L" in FIG. 9) should be at least as long as the longest headed fastener to be handled by the scoop so that such a fastener can lie evenly across the vacuum port 34.

An inner recess 262 is formed in the corner immediately adjacent the stop 32. Essentially, the inner recess 262 is a slot having flat sidewalls that are normal to the surface of the corner. The inner recess 262 is configured to receive the head 258 of a headed fastener when the fastener slides head-first toward the stop. Accordingly, as shown in FIG. 11, the fastener will lie evenly across the vacuum port. As also can be seen in FIG. 11, when headed fasteners are selected and when the particular fastener that will be captured by the suction in the vacuum port slides head-first toward the stop 32, the inner recess 262 will halt the sliding movement of the fastener when the radially projecting portion of the fastener head slides into the recess.

The blade 28 of the scoop has rounded corners on its leading edge to facilitate the penetration of the scoop into a pile of fasteners. The surface area of the blade is large enough to collect a sufficient number of fasteners after the scoop is thrust into the pile of fasteners as shown in FIG. 7 (solid lines). The scoop collects a sufficient number of fasteners from the pile when the width of the blade (measured parallel to the longitudinal axis of the corner 30) is approximately three times the length of the longest fastener to be selected, and the center length of the blade (measured from the corner to the leading edge of the blade) is approximately one and one half times the length of the longest fastener to be selected. Further, the height of the back wall 222 should be approximately one and one half times the length of the largest fastener to be selected. While the dimensions just set forth are the preferred dimensions, they can be considerably varied without detrimental effect of the performance of the scoop.

As noted earlier, the bins 24 into which the scoop is thrust are arrayed on a turntable 38 located in front of the scoop. In the present embodiment, the bins are arranged in four vertical columns. Each column comprises four vertically stacked bins. Clearly, fewer or more than four columns of bins could be used and the columns could have fewer or more than four bins each.

The bins 24 are elongate, box-like containers. The outer ends of the bins are open for access by the scoop. Each bin has a bottom plate 27 for supporting a pile of fasteners 26. In longitudinal cross section (FIG. 2), the bottom plate slopes approximately 45° upwardly from the center of the bin toward the rear of the bin and approximately 10° upwardly from the center of the bin to the open end of the bin. The configuration of the bottom plate of the bin ensures that the fasteners within the bin are kept in a pile where the upper side 248 of the blade is thrust when the scoop is moved into a bin.

The turntable 38 is rotatable so that any particular column of bins can be positioned in front of the scoop. To this end, the turntable is attached to a drive shaft 39 that extends through the center of the turntable between the top and bottom of the support framework 42. The drive shaft 39 is connected by a pulley 41 and a belt 43 to a turntable motor 45 mounted to the bottom of the framework 42. Preferably, the turntable motor is an AC electric motor. A turntable position encoder 47 is connected to the upper end of the turntable drive shaft 39. The turntable position encoder provides a signal that is indicative of the rotational position of the turntable drive shaft and, hence, the rotational position of the column of bins relative to the scoop. The position signal produced by the encoder 47 is used in the control of the sequence of operations of the apparatus, described in detail below.

Referring to FIGS. 1, 2 and 8, the intake device 36 into which a segregated fastener is dropped by the scoop is preferably a device for feeding fasteners to a fastener installing apparatus. One such fastener feeding device is described in U.S. patent application Ser. No. 797,962, filed Nov. 14, 1985, and entitled Device for Orientating and Conveying a Headed Fastener. In any event, the intake device 36 is attached to the carriage 40 by brackets 37 and positioned so that it lies just below the scoop 20 when the scoop is in its fully retracted position. The intake device 36 is connected by a flexible output tube to an automatic fastener installing machine (not shown).

Figure 12:
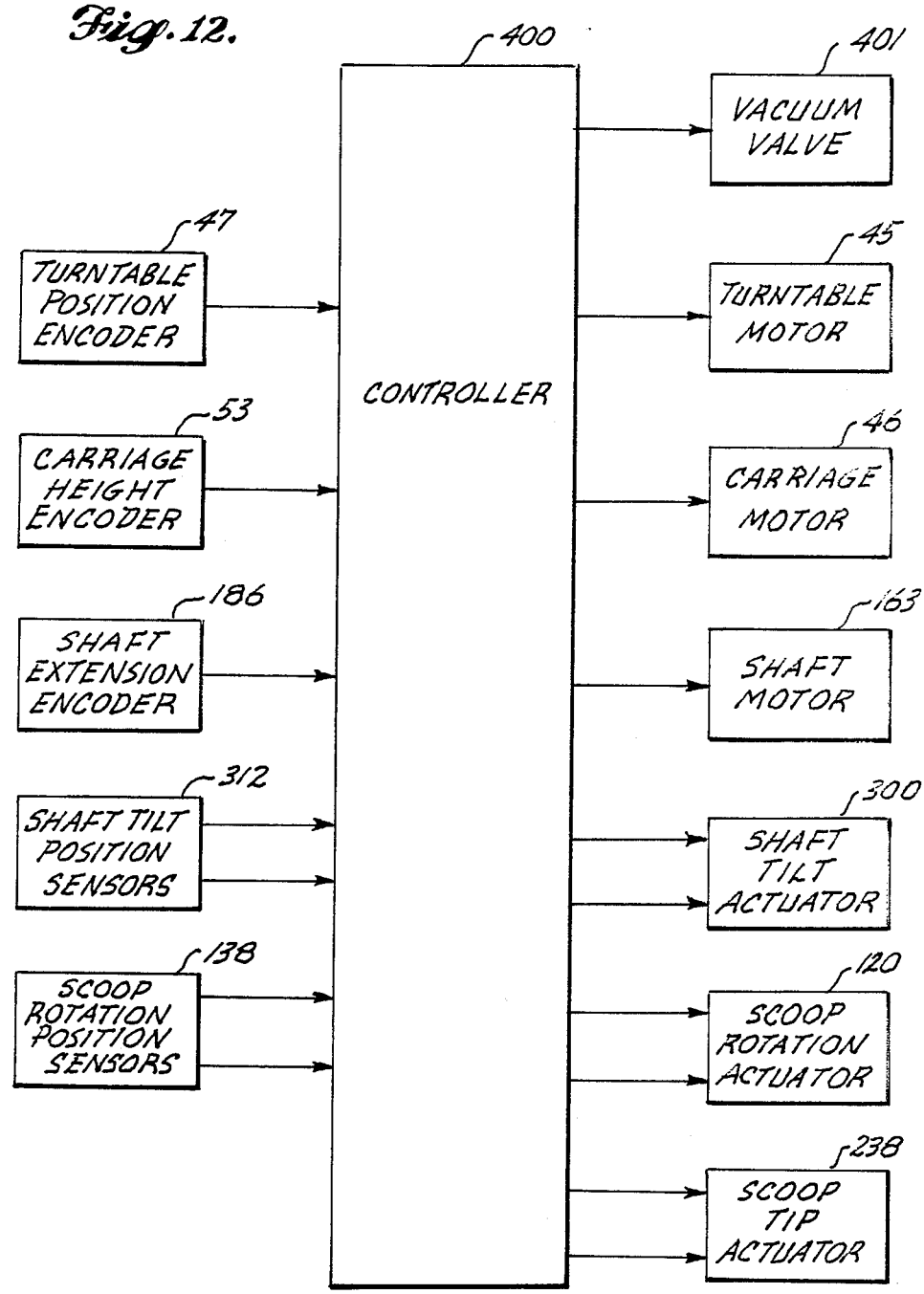

FIG. 12 is a block diagram of the control system for the fastener selection apparatus illustrated in FIGS. 1–11. As shown in FIGURE 12, the various sensing devices, e.g., the turntable position encoder 47, the carriage height encoder 53, the shaft extension encoder 186, the shaft tilt position sensors and the scoop rotation sensors are connected to a controller 400 via suitable input interfaces. The controlled devices, i.e., the vacuum valve 401 that controls the application of vacuum to the vacuum port 34, the turntable motor 45, the carriage motor 46, the shaft extension motor 163, the shaft tilt actuator 300, the scoop rotation actuator 120 and the scoop tip actuator 238, are connected to the controller 400 via suitable output interfaces. The controller is, in essence, a computer programmed to control the fastener selection apparatus illustrated in FIGS. 1–11 so that the appropriate fasteners are selected and delivered to the intake device 36 for delivery to a fastener installing apparatus in the sequence required in order to accomplish a particular assembly operation.

The controller is first programmed with information regarding the precise angular position of each column of bins 24 with respect to the radial position of the shaft 22. The angular position information is stored in a form that allows it to be compared with the output of the turntable position encoder 47. The controller is also programmed with carriage height information that defines the elevation of each layer of bins 24. Preferably, carriage height information is in the form of pulse counts that start at low magnitude, e.g., zero, when the carriage is at its lowest position and increase as carriage height increases. In any event, the carriage-bin aligned height information is stored in a form that allows it to be compared with the accumulated pulses generated by the carriage height encoder 53. The controller is further programmed with shaft extension information that defines when the scoop is extended into a bin and when the scoop is retracted. Again, this information is stored in a form that allows it to be compared with the accumulated pulses produced by the shaft extension encoder 186. The controller is also programed to compare the information produced by the shaft tilt and scoop rotation position sensors 312 and 138 with stored information to determine the position of shaft tilt and scoop rotation actuators 300 and 120. Further, the controller is programmed to store information regarding which size and type of fastener is stored in each bin. Based on the stored information and the signals produced by the sensing devices, the controller controls the controlled devices such that, based on a sequence selected by a user, fasteners are selected in sequence and moved to the intake 36 for transportation to a fastener installation apparatus.

The first step of a typical cycle, beginning with the apparatus in the shaft retracted, scoop upright starting position shown in solid lines in FIG. 2, is to rotate the turntable 38 until the column of bins that includes the bin having the selected fastener is facing the scoop 20. This is accomplished by comparing the angular position of the bins with the angular position of the column with the bin containing the selected fastener, and using the result to control the energization of the turntable motor. The next step is to raise or lower the carriage 40 as needed to align the scoop with the bin that holds the needed fastener. This is accomplished by comparing the elevation of the bin containing the selected fastener with the elevation of the carriage and using the result to control the energization of the carriage motor. Next, the shaft 22 is extended toward the bin until the scoop is thrust into the pile of fasteners in the bin. This is accomplished by energizing the shaft extension motor 163 until the accumulated value of the pulses created by the shaft extension encoder denotes that the scoop is in a bin. Then, suction is applied to the vacuum port 34 by opening vacuum valve 401. Thereafter, the scoop is tipped upwardly to capture a number of fasteners on the scoop's contact surface by actuating the scoop tip actuator 238. Simultaneously therewith, the shaft is tilted so that the scoop rises out of the pile of fasteners by actuating the shaft tilt actuator 300. Then the scoop rotation actuator 120 is energized to rotate the scoop. As a result, a single captured fastener is located in the scoop. Next, the shaft is retracted until the scoop is over the intake device 36. Then the vacuum to the port is shut off. As a result, the captured fastener falls into the intake device. Finally, the scoop is rotated back to its upright starting position. The cycle is then repeated for the next fastener needed in the assembly operation.

While a preferred embodiment of the invention has been illustrated and described, it will be appreciated that various changes can be made therein without departing from the spirit and scope of the invention. For example, pneumatic rather than hydraulic actuators can be used. Further, the carriage can be moved past a plurality of bins, rather than the bins rotated in front of the carriage. Consequently, the invention can be practiced otherwise than as specifically described herein.

The embodiments of the invention in which an exclusive property or privilege is claimed are defined as follows:

1. A fastener selection apparatus for segregating a single fastener from a pile of fasteners comprising:
   (a) a scoop having an elongate corner defined by an intersection of two surfaces;
   (b) extension/retraction means connected to the scoop for thrusting the scoop into a pile of fasteners such that at least a portion of one of the two surfaces is immersed in the pile of fasteners and removing the scoop from the pile of fasteners;
   (c) tipping means connected to the scoop for tipping the scoop, the scoop being configured and arranged so that when it is tipped, fasteners located on said one surface of the scoop are slidingly directed into contact with the elongate corner of the scoop;
   (d) inversion means connected to the scoop for moving the scoop between an upright position and an inverted position, the scoop being configured so that as it moves from the upright position to the inverted position, fasteners in contact with the corner of the scoop slide along the length of the corner toward an end thereof; and,
   (e) fastener capture means for selectively holding a single fastener that is within the elongate corner, as said scoop is moved from said upright position to said inverted position.

2. The fastener selection apparatus of claim 1, wherein the fastener capture means includes:
   (a) a stop projecting outwardly from the elongate corner, the stop being positioned adjacent said one end of the elongate corner, so as to interfere with the movement of any fastener sliding along the elongate corner when the scoop moves from the upright to the inverted position;
   (b) a vacuum port formed in the elongate corner of the scoop, near the stop; and
   (c) selectively actuatable vacuum means connected to the vacuum port for producing a vacuum within the vacuum port, the stop and vacuum port operatively associated to capture a single fastener that is moved into and along the corner adjacent the stop.

3. The fastener selection apparatus of claim 2, wherein the vacuum port is located near the stop within a distance that is less than or equal to the length of the fastener.

4. The fastener selection apparatus of claim 3, wherein the elongate corner is concave and wherein the radius of that concavity is substantially equal to the radius of the fastener.

5. The fastener selection apparatus of claim 2, further including a first recess formed in the elongate corner of the scoop on one side of the vacuum port between the vacuum port and the stop; and a second recess formed in the elongate corner of the scoop, on the other side of the vacuum port, the first and second recesses configured to receive the head of the headed fastener.

6. The fastener selection apparatus of claim 5, wherein the second recess has walls that are substantially rounded.

7. The fastener selection apparatus of claim 1, wherein the extension/retraction means includes:
   (a) a carriage;
   (b) a shaft mounted on the carriage and having a forward end and a rearward end, the forward end connected to the scoop; and
   (c) shaft drive means mounted on the carriage for alternatively extending and retracting the shaft and, thus, the scoop.

8. The fastener selection apparatus of claim 7, wherein said shaft is hollow and wherein the shaft drive means includes:
   (a) a threaded drive screw mounted in said hollow shaft, said shaft threadably engaging said drive screw such that rotation of the drive screw in one direction results in a forward extension of the shaft along its longitudinal axis, and rotation of the drive screw in the opposite direction results in a rearward retraction of the shaft along its longitudinal axis; and
   (b) reversible drive means mounted on the carriage for rotating the screw drive.

9. The fastener selection apparatus of claim 8, wherein the extension/retraction means further includes tilting means for selectively altering the inclination of the longitudinal axis of the shaft and thereby selectively moving the scoop upwardly away from the pile of fasteners and downwardly toward the pile of fasteners when said scoop is extended.

10. The fastener selection apparatus of claim 9, wherein:
    (a) the carriage includes:
       a carriage frame and
       a support bracker connected to the carriage frame;
    (b) an elongate beam is pivotally mounted to the support bracket, said shaft, drive screw and reversible drive means being mounted to the beam; and
    (c) the tilting means comprises a cylinder with an associated selectively extendable and retractable piston element, the cylinder and piston element being interconnected between the carriage frame and the beam.

11. The fastener selection apparatus of claim 7, wherein the tipping means comprises:
    (a) a link connected at one end to the forward end of the shaft, the other end of the link being pivotally connected to the scoop; and
    (b) a cylinder with an associated selectively extendable and retractable piston element, the cylinder and piston element of the tipping means being interconnected between the link and the scoop so that extension of the piston element results in swinging of the scoop about the pivotal connection with the link until substantially all of said one surface of the scoop is downwardly inclined toward the elongate corner.

12. The fastener selection apparatus of claim 7, wherein the inversion means comprises:

(a) a crank slidably mounted to the shaft to permit translational movement of the shaft along the longitudinal axis of the shaft while engaging the shaft for rotation of the shaft about the shaft's longitudinal axis; and, (b) a shaft rotation means interconnected between the crank and the carriage, the shaft rotation means being selectively actuable for rotating the crank and shaft and, thereby, moving the scoop between its upright and inverted positions.

13. The fastener selection apparatus of claim 12, wherein the shaft rotation means comprises:

(a) a mounting plate fastened to the beam;

(b) a cylinder with an associated selectively extendable and retractable piston element mounted on the mounting plate; and, (c) a connect arm, one end of the connector arm being pivotally attached to the piston element of the shaft rotation means and the other end of the connector arm being pivotally connected to the crank.

14. The fastener selection apparatus of claim 1, wherein the two surfaces defining the elongate corner of the scoop comprise a blade and an adjoining back wall extending substantially perpendicular to the blade, the thickness of the blade tapering in the direction away from the adjoining wall.

15. The fastener selection apparatus of claim 1, further comprising:

(a) a movable support member positioned near the scoop;

(b) a plurality of bins arrayed on the support member, each bin configured to hold a pile of fasteners, the bins having an open end for permitting access to the bin's pile of fasteners by the scoop; and, (c) bin selection means for moving a selected bin into a bin access position, said bin access position being a position aligned with the scoop such that the scoop can be thrust into the pile of fasteners in the selected bin.

16. The fastener selection apparatus of claim 15, wherein said bin selection means includes a scoop lift mechanism, said scoop lift mechanism comprising:

(a) a carriage for supporting said extension/retraction means and said scoop; and (b) carriage elevator means for supporting and selectively elevating said carriage so that the scoop is vertically positionable.

17. The fastener selection apparatus of claim 16, wherein said elevator means includes a pair of carriage support members positioned to pass through said carriage.

18. The fastener selection apparatus as claimed in claim 17, wherein:

(a) said carriage support members are threaded shafts;

(b) said carriage includes annuli through which said threaded shafts pass; and, (c) said bin selection means includes motor means coupled to said threaded shafts to rotate said threaded shafts.

* * * * *

UNITED STATES PATENT AND TRADEMARK OFFICE
CERTIFICATE OF CORRECTION

PATENT NO. : 4,848,592
DATED : July 18, 1989
INVENTOR(S) : P.J. Shemeta

It is certified that error appears in the above-identified patent and that said Letters Patent is hereby corrected as shown below:

| Column | Line | |
|---|---|---|
| 2 | 61 | "within" should be --with-- |
| 3 | 11 | after "vibration" insert --mechanisms-- |
| 3 | 19 | "verticle" should be --vertical-- |
| 6 | 12 | "actuable" should be --actuatable-- |
| 9 | 31 | "tiled" should be --tilted-- |
| 10 | 59 | after "is" delete "a" |
| 11 | 46 | "port" should be --port,-- |
| 14 | 28 | "programed" should be --programmed-- |
| 16 | 32 | "screw drive" should be --drive screw-- |
| 17 | 8 | "actuable" should be --actuatable-- |

UNITED STATES PATENT AND TRADEMARK OFFICE
CERTIFICATE OF CORRECTION

PATENT NO. : 4,848,592

DATED : July 18, 1989

INVENTOR(S) : P. J. Shemeta

It is certified that error appears in the above-identified patent and that said Letters Patent is hereby corrected as shown below:

Column    Line 17            19          "connect" should be --connector--

Signed and Sealed this

Second Day of October, 1990

*Attest:*

HARRY F. MANBECK, JR.

*Attesting Officer*        *Commissioner of Patents and Trademarks*